US006710467B2

(12) United States Patent
Braun et al.

(10) Patent No.: US 6,710,467 B2
(45) Date of Patent: Mar. 23, 2004

(54) METHOD AND APPARATUS FOR CHANGING THE RATING OF A ELECTRONICALLY CONTROLLED ENGINE GENERATOR SET

(75) Inventors: Andrew N. Braun, Peoria, IL (US); Michael A. Dvorsky, Peoria, IL (US); Jeffrey A. Kocovsky, East Peoria, IL (US); Darren L. Krahn, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 58 days.

(21) Appl. No.: 10/195,285

(22) Filed: Jul. 15, 2002

(65) Prior Publication Data

US 2004/0007876 A1 Jan. 15, 2004

(51) Int. Cl.[7] ................................................. H02P 9/00
(52) U.S. Cl. ................. 290/40 B; 290/40 C; 290/40 A; 322/28; 322/14; 322/25
(58) Field of Search ............................ 290/40 R, 40 A, 290/40 B, 40 C, 1 A; 322/14, 15, 25, 28

(56) References Cited

U.S. PATENT DOCUMENTS

| 4,926,108 | A |   | 5/1990  | Schooley et al. ............. 322/15 |
|-----------|---|---|---------|-------------------------------------|
| 5,006,781 | A |   | 4/1991  | Schultz et al. ................ 322/25 |
| 5,038,094 | A | * | 8/1991  | Rashid ......................... 322/28 |
| 5,168,208 | A |   | 12/1992 | Schultz et al. ................ 322/25 |
| 5,390,068 | A |   | 2/1995  | Schultz et al. ................ 361/95 |
| 5,801,516 | A | * | 9/1998  | Rice et al. .................... 322/37 |
| 5,900,722 | A | * | 5/1999  | Scott et al. ................... 322/46 |
| 6,172,428 | B1|   | 1/2001  | Jordan ...................... 290/40 C |
| 6,555,929 | B1| * | 4/2003  | Eaton et al. .............. 290/40 B |

OTHER PUBLICATIONS

Statement of Sale of Related Art.

* cited by examiner

Primary Examiner—Nicholas Ponomarenko
(74) Attorney, Agent, or Firm—Robin S. Fahlberg

(57) ABSTRACT

Method and apparatus for changing the rating of engine generator set by selecting a generator set rating using a rating selector included in the generator set control system. The generator set rating includes at least an engine rating and voltage.

20 Claims, 3 Drawing Sheets

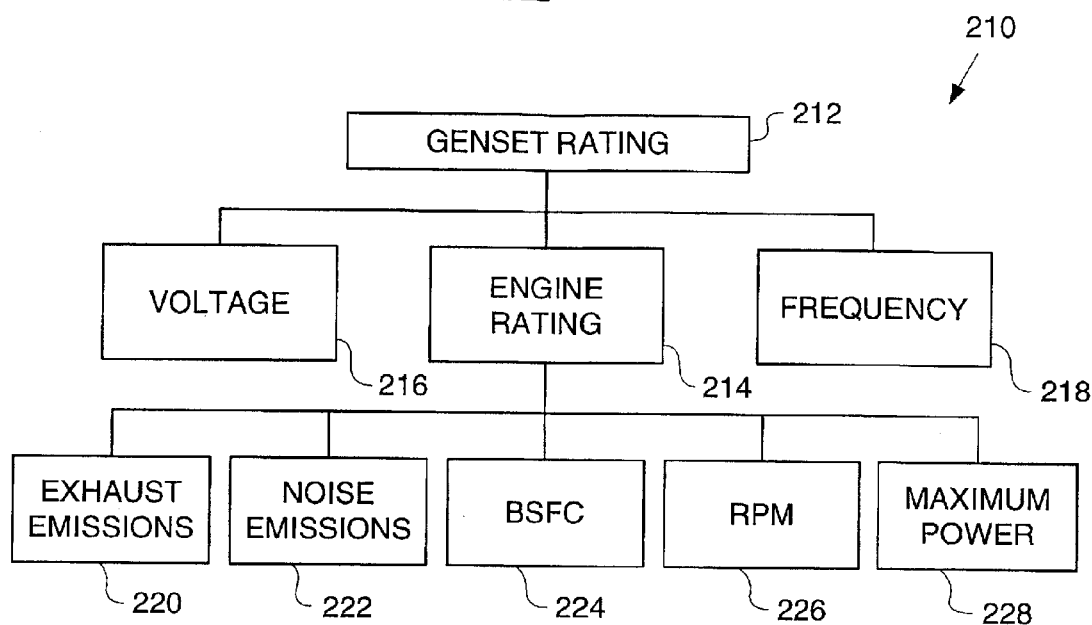
Fig_2_
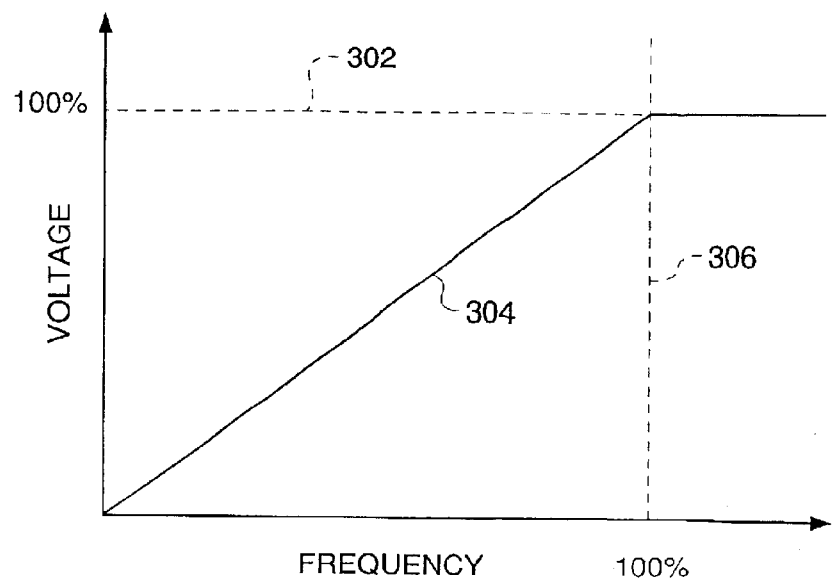
Fig_3_

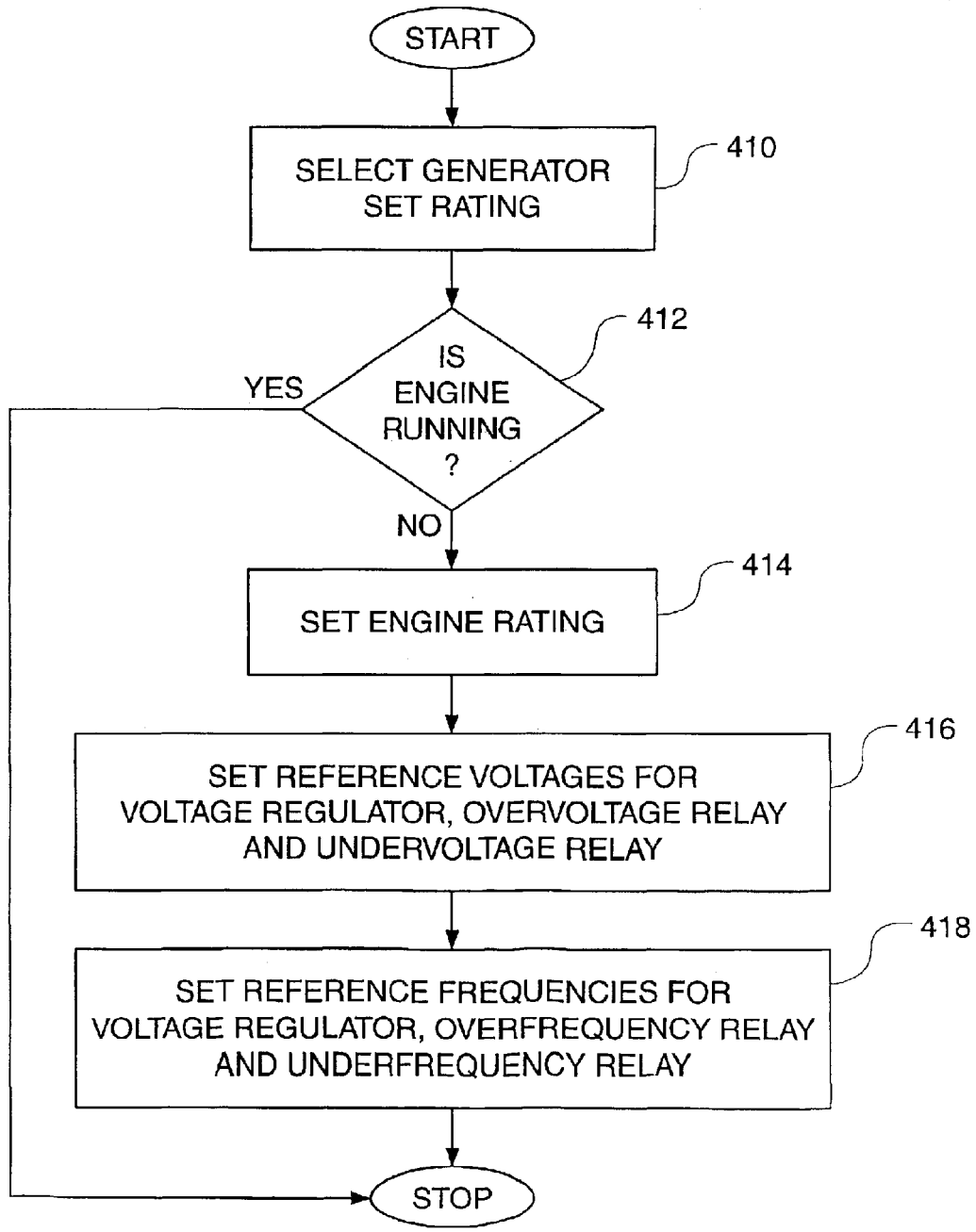

US 6,710,467 B2

METHOD AND APPARATUS FOR CHANGING THE RATING OF A ELECTRONICALLY CONTROLLED ENGINE GENERATOR SET

TECHNICAL FIELD

This invention relates generally to power generation and distribution systems and, more particularly, to a method and apparatus for selectively changing a generator set output rating.

BACKGROUND

Engine generator sets (hereafter referred to as "gensets" or in the singular as "genset") of a wide variety of sizes and power load capacities are commonly utilized as prime or backup power sources for a wide variety of electrically driven equipment in applications and locales having different requirements. For example, many locales require gensets to meet specific exhaust and noise emission levels. One locale may require low levels of particulates and Nitrous Oxides (NOX) compared to other locales. Another site may require even lower particulates but allow greater levels of NOX. Still another may have no exhaust emission requirements. Similarly, regulations on noise emissions also vary from location to location.

In addition to different emission requirements, genset applications may have different power requirements. One site, for example a remote quarry, may use the genset as its primary power source and need continuous power. Another site, for example a hospital, may use the genset for standby power. A genset used as a standby or auxiliary power source is generally able to run at a higher power rating than the same genset used as a prime power source.

Voltage and frequency requirements of equipment powered by the genset vary as well. For instance, in the United States 480V and 60 Hz is a common requirement for electrical equipment, whereas European applications are more likely to need 400V and 50 Hz power. Gensets that are able to provide a certain power level at one voltage and frequency may not be able to supply the same power at another voltage and frequency.

By changing the software instructions controlling genset operation, an electronically controlled genset can produce different ratings optimized for different application requirements with no mechanical changes. For example, a genset may be controlled by software instructions that produce a rating with characteristics of 60 Hz, certain emission regulations, the best possible fuel economy for that point of operation and 480V. The same software instructions may not produce a rating that meets emission requirements and genset physical limitations if the engine were running at 50 Hz and 400V. But, another set of software instructions can be developed to produce a rating that meets emission requirements and genset physical limitations at 50 Hz and 400V.

Typically, a service tool is needed to change the rating of an engine. A variety of service tools are available for this task, such as a computer device or personal digital assistant capable of physically connecting to the ECM. Sometimes the engine rating software instructions must be loaded or flashed into the ECM; other times the ECM contains a plurality of sets of software instructions, each producing a specific engine rating, and the service tool is used to select one.

Typically, a voltage regulator is adjusted manually or with a service tool to control the genset voltage. Voltage regulators are typically designed to operate with a variety of different gensets with a wide range of capabilities. Thus, a particular genset, may not be capable of operating at all voltage choices available on a voltage regulator. For instance, a choice on the voltage regulator may be 600V, but the generator may be physically unable to operate at 600V, going into saturation at 550V. A technician has to know the limitations of the genset when setting the voltage and frequency on the voltage regulator.

In addition, the genset may not be able to meet the same power rating at one voltage as it can at another voltage. For instance, a genset may be able to produce 400 ekW at 240V, but only 380 ekW at 208V. If a technician changes the voltage for a genset, he or she must know when also to change the current engine rating to a different engine rating with a lower maximum power.

In addition to setting the engine and voltage ratings for a particular application, a technician may also need to set relays and other protective devices contained in the genset control system. Protective relaying, such as over and under voltage relays and over and under frequency relays, disconnects a load, shuts down the engine, prevents excitation of the generator or protects the genset in some other manner if a condition that could cause damage to the genset is detected. For example, if the voltage exceeds the acceptable rating and the genset has an overvoltage relay, the relay may trip a circuit breaker and disconnect the load, thus preventing damage to both the generator and the load. Relays must be set correctly to operate. For example, the voltage level at which the overvoltage relay will trip a circuit breaker is typically set manually or with a service tool. A technician must know the correct value at which to set this voltage.

To change the rating of a genset, a technician may need a variety of skills. He or she may need to use a service tool to change the engine rating; he or she may need to change the voltage and frequency on the voltage regulator manually or with a different service tool. The technician may further need to set protective relays and ensure all settings are compatible with each other and the genset. It may be difficult, especially in remote areas where gensets often run, to find technicians with these skills. In addition, the more steps the technician has to take to setup a genset, the more chances there are for error. It would be preferable to have a control system that overcomes these and other disadvantages.

SUMMARY OF THE INVENTION

In one aspect of the present invention, an apparatus for changing a genset rating is disclosed. The apparatus includes a control system for controlling a genset, the control system having at least two genset ratings stored therein and a rating selector, each of the genset ratings including at least an engine rating and a voltage, the rating selector having an operator input.

In another aspect of the present invention, a method for changing a genset rating is disclosed. The method includes the steps of selecting one of a plurality of genset ratings wherein the genset ratings are stored in a control system for controlling the genset and the genset ratings include at least one associated engine rating and a voltage, setting the associated engine rating, and setting the associated voltage.

In still another aspect of the present invention, a method for changing a genset rating is disclosed. The method includes the steps of selecting one of a plurality of genset ratings wherein the genset ratings are stored in a control system for controlling the genset and the genset ratings include at least one associated engine rating and a voltage, determining if the genset is running or attached to a load, setting the associated engine rating if the genset is not running or is not attached to a load, and setting the associated voltage if the genset is not running and not attached to a load.

BRIEF DESCRIPTION OF THE DRAWINGS

For a better understanding of the present invention, reference may be made to the accompanying drawings in which:

FIG. 2 is a chart depicting a genset rating and associated engine rating, voltage and frequency;

FIG. 3 is a plot of frequency vs. reference voltage for a voltage regulator; and FIG. 4 is a flow chart of a method to change the rating of a genset.

DETAILED DESCRIPTION

Figure 1:
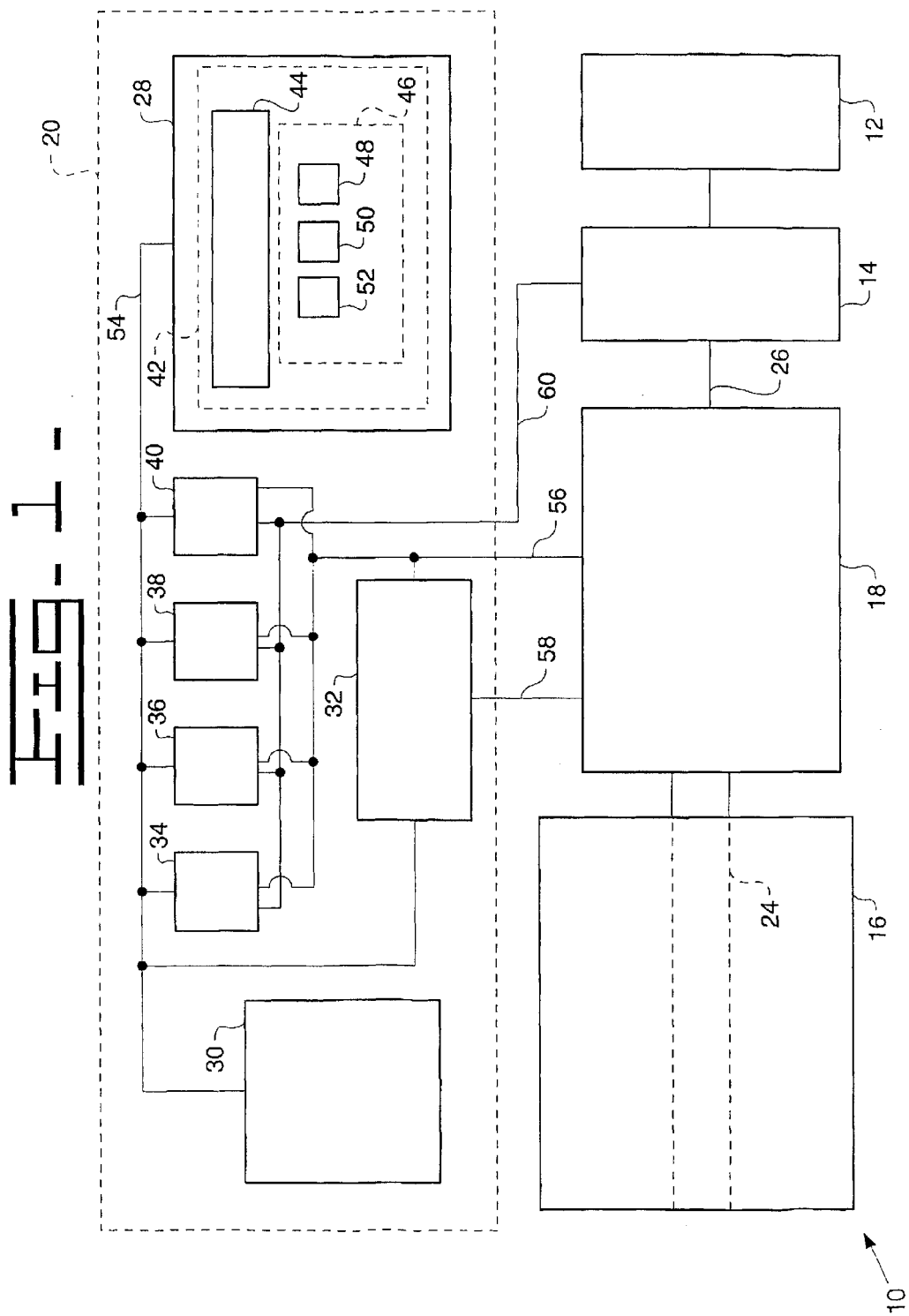
FIG. 1 is a block diagram of an engine genset connected to a load through a circuit breaker.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

FIG. 1 shows an exemplary embodiment of an electronically controlled internal combustion engine genset 10 connected to a load 12 through a circuit breaker 14. The genset 10 includes an internal combustion engine 16, a generator 18 and a genset control system 20. The circuit breaker 14 connects the genset 10 to the load 12, as is well known to those skilled in the art. The load 12 is the electrically driven equipment or devices to which the genset 10 provides electricity.

The engine 16 is preferably an electronically controlled internal combustion engine as well known by those skilled in the art, housing a crankshaft 24 that is rotated by engine internal means (not shown) well known to those skilled in the art. It produces mechanical power with the crankshaft 24 rotating at a certain revolutions per minute (hereafter referred to as "engine rpm") while producing a certain level of exhaust emission and noise and having a certain BSFC and engine life.

The generator 18 is preferably an AC generator as well known to those skilled in the art. The generator 18 is mechanically coupled to the engine crankshaft 24, in a such manner that the engine rpm determines the frequency of the AC power produced by the generator 18 as well known to those skilled in the art. In this embodiment, the generator 18 has leads 26 that are mechanically coupled to the circuit breaker 14 and transmit the AC power produced by the generator 18 at a certain voltage and frequency to the load 12 through the circuit breaker 14. In alternative embodiments the generator 18 may transmit power through other means to which a load 12 can be connected. Additionally, in alternative embodiments the leads 26 may be attached directly to the load 12, to bus bars, to multiple circuit breakers or other means to connect a load 12 as are well known to those skilled in the art.

The genset control system 20 includes a genset control panel 28, an ECM 30, a voltage regulator 32, an overvoltage relay 34, an undervoltage relay 36, an overfrequency relay 38, and an underfrequency relay 40. In alternative embodiments the control system 20 may be contained in one or more control modules. Additionally in the alternative, the control system 20 may not include the relays 34–40, or the relays 34–40 may be part of the voltage regulator 32, control panel 28 or another portion of the control system 20. In this embodiment the control system 20 is physically located with the engine 16 and generator 18. In the alternative, the control system 20 or parts of the control system 20 may be remotely located.

The generator control panel 28 includes a rating selector 42. The rating selector 42 includes a display area 44 and a keypad 46. The keypad 46 includes 3 touch areas 48, 50, 52. The first touch area 48 is used to activate the rating selector 42. The second touch area 50 scrolls through the available options that are displayed on the display area 44. The third touch area 52 selects the option being displayed. Preferably, the rating selection control is only functional when the engine 16 is not running or the genset is not attached to a load 12.

The genset control panel 28 contains a memory (not shown).

FIG. 2 shows a chart 210 depicting one of at least 2 genset ratings 212 stored in the genset control panel 28 memory. Preferably, the at least two genset ratings 212 are achievable within the physical limitations of the genset 10. Each genset rating 212 is associated in the control panel memory with an engine rating 214, a voltage 216 and a frequency 218. In alternative embodiments there may only be a voltage 216 and an engine rating 214 associated with a genset rating 212. The engine rating 214 is associated with a certain level of exhaust emissions 220, noise emissions 222, BSFC 224, engine rpm 226 and maximum power 228. The software instructions to produce the engine rating 214 are stored in the ECM 30. In alternative embodiments, the software instructions to produce the engine rating 214 may be stored in the control panel 28 or another location in the control system 20

For example, the genset 10 may have two genset ratings 212 stored in the control panel 28 memory. One rating 212 may be geared for the European market for standby applications and be associated with a voltage 216 of 400V, frequency 218 of 50 Hz and an European engine rating 214. The European engine rating 214 might have a maximum power 228 that will produce 400 ekW to the load 12, an rpm 226 of 1500, exhaust and noise emissions 220, 222 that meet European regulations and a BSFC 224 that is higher in comparison with an engine 16 that does not have to meet European exhaust emission regulations. Another genset rating 212 might be geared towards the United States prime power market and have a voltage 216 of 480V, a frequency 218 of 60 Hz and a United States engine rating 214. The United States engine rating 214 might have a maximum power 228 that will produce 450 ekW to the load 12, an rpm 226 of 1800, exhaust and noise emissions 220, 222 that meet United States regulations and a BSFC 224 that is higher in comparison with an engine 16 that does not have to meet United States exhaust emission regulations.

In another example the genset 10 may have 2 ratings, both for equipment that requires 480V, 60 Hz and 350 ekW, but having high emissions and low emissions, i.e., one rating has lower emissions and a higher BSFC than the other rating. The first, or low emissions, genset rating 212 has a voltage 216 of 480V and a frequency 218 of 60 Hz. The low emissions engine rating 214 includes Maximum Power 228 of 350 ekW at the load 12, RPM 226 of 1800, a low exhaust emissions 220, noise emissions 222 meeting United States regulations and a high BSFC 224. The second, or high emissions, genset rating 212 has a second voltage 216 of 480V and a second frequency 218 of 60 Hz. The high emissions engine rating 214 includes Maximum Power 228 of 350 ekW at the load 12, RPM 226 of 1800, a high exhaust emissions 220, noise emissions 222 meeting United States regulations, and a low BSFC 224.

In this embodiment the display area 44 and the keypad 46 of the genset control panel 28, as seen in FIG. 1, are used to enter the desired genset rating 212. In alternative embodiments other means such as a switch or software on a computer could be used to select the desired genset rating 212. The rating selector 42 could be located on the genset control panel 28, on another part of the genset control system 20, or remotely. For example, a computer at a remote location may be operably coupled to the portion of the genset control system 20 located on the worksite, via cellular, satellite or radio link. The computer may have software allowing the user to select a genset rating 212 and may communicate the genset rating 212 selected to the portion of the genset control system 20 located on the worksite. In another example, the genset control system may have a switch with two positions. In the first example above, the first position of the switch might be marked European and the second position might be marked United States. Moving the switch to the European position would select the 400V, 50 Hz, and European genset rating, while moving the switch to the United States position would select the 480V, 60 Hz and United States genset rating.

The generator control panel 28 is operably coupled to the ECM 30 in such a way that when a genset rating 212 is selected the control panel 28 sends a signal indicating the engine rating portion 214 of the genset rating 212 to the ECM 30. In this embodiment the signal is sent via a datalink 54. In alternative embodiments, the signal might be sent from a remote location via radio signal, telephone, satellite link or other means well known to those skilled in the art; or the ECM 30 may be part of the same processing unit as the rating selector 42 and memory containing the genset ratings 212, and the desired engine rating 214 can be read by the ECM 30.

The generator control panel 28 is operably coupled to the voltage regulator 32, overvoltage relay 34 and undervoltage relay 36 in such a way that when a genset rating 212 is selected the control panel 28 sends a signal indicating the voltage portion 216 of the genset rating 212 to the voltage regulator 32, overvoltage relay 34 and undervoltage relay 36. In this embodiment the signal is sent via a datalink 54. In alternative embodiments, the signal might be sent from a remote location via radio signal, telephone, satellite link or other means well known to those skilled in the art; or the voltage regulator 32 and relays 34, 36 may be part of the same processing unit as the rating selector 42 and memory containing the genset ratings 212, and the desired voltage 216 can be read by them.

The generator control panel 28 is operably coupled to the voltage regulator 32, overfrequency relay 38 and underfrequency relay 40 in such a way that when a genset rating is selected the control panel 28 sends a signal indicating the frequency portion of the genset rating 218 to the voltage regulator 32, overfrequency relay 38 and underfrequency relay 40. In this embodiment the signal is sent via a datalink 54. In alternative embodiments, the signal might be sent from a remote location via radio signal, telephone, satellite link or other means well known to those skilled in the art; or the voltage regulator 32 and relays 38, 40 may be part of the same processing unit as the rating selector 42 and memory containing the genset ratings 212, and the desired frequency 218 can be read by them.

The ECM 30 includes a memory (not shown) that preferably stores sets of software instructions to produce at least all the engine ratings 214 associated with available genset ratings 212 in the control panel memory. When a genset rating 212 is selected and the ECM 30 receives a signal indicating the associated engine rating 214, the ECM 30 controls the engine 16 operation in response to changing conditions in accordance with the software instructions for the associated engine rating 214. This includes producing the exhaust emissions 220, noise emissions 222, BSCF 224, rpm 226 and maximum power 228 associated with that engine rating 214. Changing engine 16 conditions are communicated to the ECM 30 through sensors, algorithms and other means as well known to those skilled in the art. In an alternative embodiment, software instructions to implement engine ratings 214, other than the rating at which the engine 16 is currently running may be stored in different parts of the control system 20, such as the genset control panel 28 or a remotely located portion of the control system 20. In such a case, when the genset rating 212 is selected, the software instructions to produce associated engine rating 214 are loaded into the ECM 30 to control engine 16 operation. In still another alternative embodiment, the ECM 30 may be part of the control module where the genset ratings 212 and associated engine ratings 214 are stored, and may be able to read the selected genset rating 212 and associated engine rating 214.

The voltage regulator 32 is operably coupled to the generator 18 in such a manner that the voltage regulator 32 receives a signal indicative of the voltage the generator 18 is producing, hereafter referred to as the sensed voltage. In this embodiment the coupling is a wire 56. In alternative embodiments it may, be a wire and voltage transformer, an RF signal or shielded wire.

The voltage regulator 32 is operably coupled to the generator 18 in such a manner as to control the voltage produced by the generator 18. In this embodiment the coupling is a wire 58 that provides DC voltage and current to the generator 18.

When a genset rating 212 is selected, the associated voltage 216 is sent to the voltage regulator 32 and stored as the voltage regulator reference voltage. The voltage regulator 32 compares the voltage regulator reference voltage to the voltage produced by the generator 18, as indicated by the sensed voltage. The voltage regulator 32 adjusts the DC voltage to the generator 18, in a manner well known by those skilled in the art, such that the voltage produced by the generator 18 equals (within a certain degree of accuracy) the voltage regulator reference voltage.

The voltage regulator 32 is operably coupled to the generator 18 in such a manner that the voltage regulator 32 receives a signal indicative of the frequency the generator 18 is producing, hereafter referred to as the sensed frequency. In this embodiment the coupling is a wire 56 with the same frequency as the generator 18. In alternative embodiments it may be a wire and voltage transformer, an RF signal or shielded wire.

When a genset rating 212 is selected, the associated frequency 218 is sent to the voltage regulator 32 and the voltage regulator 32 stores that value as the voltage regulator reference frequency.

The greater the load 12 connected to the genset, the greater the torque required to rotate the engine crankshaft 24 at a given speed and the greater the horsepower demand from the engine 16. When a load 12 is first connected to the genset 10 or when the load 12 is increased quickly, there is a time delay between when the load 12 is added and when the engine 16 is able to produce the required horsepower. Horsepower is proportional to the product of rpm and torque. Consequently, the rpm of the engine 16 decreases until the engine 16 can produce the necessary horsepower. If an instantaneous load 12 increase is too great, the engine 16 may stall or take a long period to recover to the rated rpm.

Referring to FIG. 3, the voltage regulator 32 in this embodiment has a frequency compensation. If the voltage regulator reference voltage is decreased during the time delay, the total load 12 requirement is lowered. This allows the engine 16 to recover speed more rapidly than if the reference voltage were constant. FIG. 3 shows the percent of voltage regulator reference voltage 302 compared to the sensed voltage in relationship to generator frequency in plot 304. If the sensed frequency falls below the voltage regulator reference frequency 306, the sensed voltage is compared to a percentage of the voltage regulator reference voltage 302. The lower the sensed frequency, the lower the percentage of the reference voltage 302, the sensed voltage is compared to.

Frequency compensation is well known by those skilled in the art. Although frequency compensation for the voltage regulator 32 in this embodiment is a linear relationship, in alternative embodiments several linear elements may comprise the relationship curve, which may not be linear, or there may not be frequency compensation.

The overvoltage relay 34 and undervoltage relay 36 are operably coupled to the generator 18 in such a way that both relays receives a signal indicative generator 18 voltage. In this embodiment the coupling is the wire 58. In alternative embodiments it may be a wire and voltage transformer, an RF signal or shielded wire.

The overvoltage relay 34 and undervoltage relay 36 are operably connected to the circuit breaker 14 in a manner that either relay can send a signal to the circuit breaker 14 that causes the circuit breaker 14 to trip and break the connection to the load 12 as is well known to those skilled in the art. In this embodiment the connections are wire 60.

When a genset rating 212 is selected, the associated voltage 216 is sent to the overvoltage relay 34 and undervoltage relay 36 and stored as the overvoltage relay reference voltage and undervoltage relay reference voltage, respectively.

The overvoltage relay 34 compares the overvoltage relay reference voltage with the voltage produced by the generator 18, as indicated by the sensed voltage. If the generator voltage is 5% greater than the overvoltage relay reference voltage for a preset length of time, the overvoltage relay 34 sends a signal to the circuit breaker 14 causing the circuit breaker 14 to trip and causing the load 12 to be disconnected from the genset 10.

The undervoltage relay 36 compares the undervoltage relay reference voltage with the voltage produced by the generator 18, as indicated by the sensed voltage. If the generator voltage is 5% less than the undervoltage relay reference voltage for a preset length of time, the undervoltage relay 36 sends a signal to the circuit breaker 14 causing the circuit breaker 14 to trip and causing the load 12 to be disconnected from the genset 10.

The overfrequency relay 38 and underfrequency relay 40 are operably coupled to the generator 18 in such a way that both relays receive a signal indicative of the frequency the generator 18 is producing, hereafter referred to as the sensed frequency. In this embodiment the coupling is a wire 56. In alternative embodiments it may be a wire and voltage transformer, an RF signal or shielded wire.

The overfrequency relay 38 and underfrequency relay 40 are operably connected to the circuit breaker 14 in a manner that either relay can send a signal to the circuit breaker 14, that causes the circuit breaker 14 to trip and break the connection to the load 12, as is well known to those skilled in the art. In this embodiment the connections are wires 60.

When a genset rating 212 is selected, the associated frequency 218 is sent to the overfrequency relay 38 and underfrequency relay 40 and stored as the overfrequency relay reference frequency and underfrequency relay reference frequency respectively. The overfrequency relay 38 compares the generator frequency as indicated by the sensed frequency with the overfrequency relay reference frequency. If the generator frequency is 5% greater than the overfrequency relay reference frequency for a preset length of time, the overfrequency relay 38 sends a signal to the circuit breaker 14 causing the circuit breaker 14 to trip and causing the load 12 to be disconnected from the genset 10.

The underfrequency relay 40 compares the generator frequency, as indicated by the sensed frequency, with the underfrequency relay reference frequency. If the generator frequency is 5% less than the underfrequency relay reference frequency for a preset length of time, the underfrequency relay 40 sends a signal to the circuit breaker 14 causing the circuit breaker 14 to trip and causing the load 12 to be disconnected from the genset 10.

In alternative embodiments the percent the generator voltage or frequency is above or below the reference voltage or frequency, in the relays 34–40 for a preset length of time, may be greater or less than 5% when the relays 34–40 trip the circuit breaker 14. The percentage over the sensed value necessary to trigger tripping may be different for each relay 34–40. Additionally, the relays 34–40 may be connected to some other means than the circuit breaker 14 to remove the load 12 from the genset 10, shut the engine 16 off or prevent damage to the genset 10 and load 12. Some embodiments may not have relays 34–40, and in other embodiments the relays 34–40 maybe part of the genset control panel 28 or another control, module in the genset control system 20.

FIG. 4 depicts a method for selecting a genset rating 212 for the genset 10. In block 410 a genset rating 212 is selected using genset rating selector 42. The first touch area 48 is depressed to activate the rating selector 46. An available genset rating 212 is now displayed on the display area 44. The second touch area 50 is used to scroll through the available genset ratings 212. The third touch area 52 is depressed to select the desired rating.

In an alternative embodiment the genset rating 212 may be selected through a switch or through a portion of the genset control system located remotely as previously described.

In block 412 the genset control system 20 determines if the engine 16 is running. If the engine 16 is running, the control system 20 will not change the genset rating 212, and an error message is displayed on the display area 44. If the engine 16 is not running the method proceeds to block 414. In an alternative embodiment the genset control system 20 may determine if the engine 16 is running and the genset 10 is attached to the load 12. If so, the control system 20 will not change the genset rating 212, and an error message is displayed on the display area 44. If the engine 16 is not running or the genset 10 is not attached to the load or both conditions exist, the method proceeds to block 414.

In block 414 the genset control panel 28 sends a signal through the datalink 54 to the ECM 30 indicating the engine rating 214 associated with the selected genset rating 212. The software instructions to produce engine rating 214 are selected in the ECM 30 to control the engine 16. The software instructions control the engine 16 in a manner to produce the desired exhaust emissions 220, noise emissions 222, BSFC 224, RPM 226 and maximum power 228 associated with engine rating 214. In an alternative embodiment, the ECM 30 may download or flash the software instructions necessary to produce the associated engine rating 214 from another area of the control system 20 as previously described. In still another embodiment the ECM 30 may be part of the control module where the genset rating 212 and associated engine rating 214 are stored and may be able to read the selected genset rating 212 and associated engine rating 214.

In block 416, the genset control panel 28 sends a signal to the voltage regulator 32, overvoltage relay 34 and undervoltage relay 36 indicating the voltage portion 216 of the genset rating 212 selected. The voltage regulator 32, overvoltage relay 34 and undervoltage relay 36 store the voltage portion 216 of the genset rating 212 selected as the voltage regulator reference voltage, the overvoltage relay reference voltage and the undervoltage relay reference voltage, respectively.

In block 418, the genset control panel 28 sends a signal to the voltage regulator 32, the overfrequency relay 38 and the underfrequency relay 40 indicating the frequency portion 218 of the genset rating 212 selected. The voltage regulator 32, overfrequency relay 38 and underfrequency relay 40 store the frequency portion 218 of the genset rating 212 selected as the voltage regulator reference voltage, the overvoltage relay reference voltage and the undervoltage relay reference voltage, respectively.

Industrial Applicability

The present invention provides a more efficient method and apparatus for changing the rating of a genset. A single genset may be capable of operating at a variety of worksites having a variety of requirements. To meet the requirements of a site, it may be necessary to change the genset rating during installation. For example, a genset, capable of operating at several genset ratings may be owned by a company that rents equipment in different areas of the world. The genset may be rented to run at a site in Saudi Arabia that requires 380V and 60 Hz and has no restrictions on engine exhaust or noise emissions. The same genset may then be rented to run at a second site in Germany that requires 400V and 50 Hz and has much stricter requirements on levels of engine exhaust or noise emissions.

With the embodiment of the invention described above, rather than making numerous changes with numerous software service tools or through numerous operator inputs, the technician selects the genset rating for the new site, which may be name, for example, European/400V/50 Hz on the operator input of the rating selector. The genset control system then checks to see if the genset is running or if the genset is attached to a load. If the genset is running and attached to a load, the genset control system sends an error message. If the genset is not running or is not attached to a load, the genset control system identifies the engine rating associated with the selected genset rating. The associated engine rating meets exhaust and noise emission standards for Europe, runs the engine at an rpm to produce 50 Hz and provides a maximum power rating consistent with the genset running at 400V and 50 Hz. The genset control system further sends a signal to the ECM telling the ECM to operate the engine with software instructions that produce the associated engine rating. The genset control system then identifies the voltage associated with the genset rating chosen, i.e. 400V, and sends a signal to the voltage regulator and the overvoltage and undervoltage relays that sets the reference voltage on the voltage regulator and the overvoltage and undervoltage relays to the correct levels. The genset control system then identifies the frequency associated with the genset rating chosen, i.e. 50 Hz, and sends a signal to the voltage regulator and the overfrequency and underfrequency relays that sets the reference frequency on the voltage regulator and the overfrequency and underfrequency relays to the correct levels.

In another example, the genset rating may be selected a keyboard of a computer remotely located and connected to the portion of the genset control system on the worksite through a communication network such as a satellite link. Once the genset is installed on site, a technician can choose the genset rating to meet site requirements on the remotely located computer keyboard. The portion of the genset control system located on the worksite receives a signal representative of the chosen genset rating via the communication network. If the genset is not running or is not connected to a load, the genset control system identifies the engine rating, voltage and frequency associated with the selected genset rating and adjusts settings on the ECM, voltage regulator and protective relays such that the genset operates at the chosen rating.

Other aspects, objects and features of the present invention can be obtained from a study of the drawings, the disclosure and the appended claims.

What is claimed is:

1. A control system for use on a generator set, said generator set having an internal combustion engine connected with a generator, said control system comprising:
   an electronic controller connected with said internal combustion engine and said generator;
   memory connected with said electronic controller, said memory having stored therein a plurality of generator set ratings; and
   a rating selector connected with said electronic controller, said rating selector having operator inputs, wherein said electronic controller selects a generator set rating as a function of said operator inputs, wherein each generator set rating include at least one associated engine rating and voltage, and wherein said electronic controller produces engine command signals and generator control signals as a function of a selected generator set rating.

2. The apparatus of claim 1 wherein each of said genset ratings further include a frequency.

3. The apparatus of claim 1 wherein the control system further includes an ECM.

4. The apparatus of claim 1 wherein the control system further includes an voltage regulator.

5. The apparatus of claim 1 wherein the control system further includes at least one protective relay.

6. The apparatus of claim 1 wherein the rating selector includes a keypad.

7. The apparatus of claim 1 wherein the rating selector is located remotely.

8. The apparatus of claim 1 wherein the rating selector includes a switch.

9. A method for changing a genset rating wherein a plurality of genset ratings are stored in a control system for controlling a genset, comprising:

selecting one of a the plurality of genset ratings, wherein each of the genset ratings include at least one associated engine rating and voltage;

producing engine command signals as a function of the selected genset rating; and producing generator control signals as a function of the selected genset rating.

10. The method of claim 9 producing generator control signals includes setting the voltage regulator reference voltage.

11. The method of claim 9 wherein producing generator control signals includes setting a protective relay reference voltage.

12. The method of claim 9 wherein each of the genset ratings include a frequency rating.

13. The method of claim 12 wherein producing generator control signals includes setting the voltage regulator reference frequency.

14. The method of claim 12 producing generator control signals includes setting a protective relay reference frequency.

15. A method for changing a genset rating wherein a plurality of genset ratings are stored in a control system for controlling a genset, comprising:

selecting one of a plurality of genset ratings wherein each of the genset ratings include at least one associated engine rating and voltage;

determining if the genset is running or attached to a load;

producing engine command signals as a function of the selected genset rating if the genset is not running or is not attached to a load; and producing generator control signals as a function of the selected genset rating if the genset is not running or is not attached to a load.

16. The method of claim 15 wherein producing generator control signals includes setting the voltage regulator reference voltage.

17. The method of claim 15 producing generator control signals includes setting a protective relay reference voltage.

18. The method of claim 15 wherein each of the genset ratings include a frequency rating.

19. The method of claim 18 producing generator control signals includes setting the voltage regulator reference frequency.

20. The method of claim 18 producing generator control signals includes setting a protective relay reference frequency.

* * * * *